United States Patent
Fujiwara

(10) Patent No.: US 8,419,592 B2
(45) Date of Patent: Apr. 16, 2013

(54) ENGINE AUTOMATIC-STOP/RESTART SYSTEM

(75) Inventor: Michitaka Fujiwara, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 13/278,420

(22) Filed: Oct. 21, 2011

(65) Prior Publication Data

US 2012/0295759 A1    Nov. 22, 2012

(30) Foreign Application Priority Data

May 17, 2011 (JP) .................. 2011-110274

(51) Int. Cl.
*B60K 23/02* (2006.01)
*B60W 10/02* (2006.01)
*B60W 10/06* (2006.01)

(52) U.S. Cl.
USPC .......................................... 477/167; 477/181

(58) Field of Classification Search ............. 477/167, 477/178, 180, 181
See application file for complete search history.

(56) References Cited

U.S. PATENT DOCUMENTS

2005/0221958 A1* 10/2005 Lee et al. ............. 477/167
2009/0286652 A1* 11/2009 Noel et al. ............ 477/167
2010/0174465 A1*  7/2010 Gibson et al. ........... 701/70

FOREIGN PATENT DOCUMENTS

JP    4214401 B2    12/2005
JP    2009-063001 A    3/2009

* cited by examiner

*Primary Examiner* — Edwin A Young
(74) *Attorney, Agent, or Firm* — Sughrue Mion, PLLC

(57) ABSTRACT

An engine automatic-stop/restart system resumes injection of fuel when an engine restart condition is satisfied, and energizes the starter motor when, after injection of the fuel has resumed, starting of the engine is not completed. The system can also control the coupling degree of a forward clutch under certain conditions, and energize a solenoid to engage a starter pinion with a crankshaft ring gear when their relative speeds are close to each other. The system then releases the forward clutch after the pinion and the ring gear have engaged.

3 Claims, 12 Drawing Sheets

ENGINE AUTOMATIC-STOP/RESTART SYSTEM

BACKGROUND OF THE INVENTION

1. Field of the Invention

The present invention relates to an engine automatic-stop/restart system that automatically stops an engine when an automatic stopping condition is satisfied and then restarts the engine when a restarting condition is satisfied.

2. Description of the Related Art

In recent years, for the purpose of improving the gasoline mileage of a motor vehicle or the like and reducing an environmental load, there has been developed an engine automatic-stop/restart system that automatically cut off the supply of fuel so as to automatically stop an engine, when the operation of a driver, e.g., brake-pedal stepping-on operation while the motor vehicle travels at a speed lower than a predetermined speed, satisfies a predetermined condition for stopping the engine, and then restarts fuel injection so as to automatically restart the engine, when the operation of the driver satisfies a predetermined condition for restarting the engine, e.g., brake-pedal releasing operation, accelerator stepping-on operation, or the like.

To date, as such an engine automatic-stop/restart system, there has been proposed a system (for example, refer to Patent Document 1) in which when an engine restart request occurs after idling-stop driving is performed, speed-governing energization of the starter motor is started; at a time instant when the rotation speed of the starter motor becomes close to an anticipated rotation speed of the engine, the coupling between the pinion gear and the ring gear is started; at a time instant when the rotation speed of the motor (here means the rotation speed of the pinion gear, and the same applies hereinafter) and the rotation speed of the engine synchronize with each other, the coupling between the pinion gear and the ring gear is ended; after the end of the coupling, full-power energization of the starter motor is performed so that the starter motor drives the engine; then, the restart of the engine is completed.

In the case of the conventional system disclosed in Patent Document 1, before the rotation of the engine completely stops, the engagement between the pinion gear and the ring gear is realized; therefore, it is made possible to restart the engine rapidly.

To date, as such an engine automatic-stop/restart system, there has been proposed a system (for example, refer to Patent Document 2) in which the rotation speed of the engine is maintained by coupling the crankshaft of the engine and the wheel axle by the intermediary of a lockup clutch, and in the case where the rotation speed at a time when the restart request occurs is the same as or lower than a predetermined rotation speed, the starter motor is energized and then the starter motor drives the engine so as to complete the restart of the engine.

In the case of the conventional system disclosed in Patent Document 2, because the rotation speed of the engine is maintained by coupling the crankshaft of the engine and the wheel axle by the intermediary of a lockup clutch, it is made possible to restart the engine rapidly even in the case where the engine cannot be restarted by simply injecting a fuel.

PRIOR ART REFERENCE

Patent Document

[Patent Document 1] Japanese Patent No. 4214401
[Patent Document 2] Japanese Patent Application Laid-Open No. 2009-63001

In the conventional system disclosed in Patent Document 1, the engine rotation speed at a time instant when the pinion gear and the ring gear make contact with each other is anticipated, and then the synchronization between the pinion gear and the ring gear is started; however, in order to accurately anticipate the engine rotation speed, an engine control system, which controls the engine, needs to calculate an anticipated value by taking the load condition of the engine, the change thereof with time, and the like into consideration; thus, there has been a problem that a large load is imposed on the engine control system. Moreover, there has been a problem that when the anticipation of the engine rotation speed is different from the actual rotation speed, large noise is caused when the pinion gear and the ring gear make contact with each other or the engagement between the pinion gear and the ring gear fails, and hence restarting of the engine cannot be performed. Accordingly, there has been proposed a method in which the pinion gear and the ring gear are made to be on standby immediately before they engage with each other; however, in order to make the pinion gear and the ring gear on standby immediately before they engage with each other, it is required that the solenoid for pushing out the pinion gear can preliminarily be energized in a duty driving manner; thus, there has been a problem that it is required to utilize expensive components and expensive electronic circuits.

Meanwhile, in the conventional system disclosed in Patent Document 2, in order to maintain the engine rotation speed even after the engine has automatically stopped, the lockup clutch and the forward clutch are made to engage with each other so that the wheel axle and the crankshaft are directly coupled. After that, when in response to the engine restarting request, the engine stopping request is cleared and then the engine restarts, the lockup clutch and the forward clutch are released in order to restart the engine, so that the direct coupling between the wheel and the engine is released; thus, in the case of an engine whose engine rotation speed rapidly decreases, before the fuel is ignited and burns due to the restarted fuel injection, the engine may stop. In the case of a starting apparatus that, in order to deal with the foregoing case, not only drives a starter but also makes the pinion gear and the ring gear engage with each other so as to restart the engine, after the rotation speed of the pinion gear and the rotation speed of the ring gear have synchronized with each other, when the anticipation of the engine rotation speed is different from the actual rotation speed, the engagement between the pinion gear and the ring gear fails and hence restarting of the engine cannot be performed. Accordingly, it is required that the starter motor is temporarily stopped, and after the engine rotation and the starter rotation have both stopped, the pinion gear and the ring gear are again made to engage with each other so that the starter motor is driven so as to perform starting again; thus, there has been a problem that starting time is prolonged.

SUMMARY OF THE INVENTION

The present invention has been implemented in order to solve the foregoing problems in the conventional systems; the objective thereof is to obtain an engine automatic-stop/restart system that can shorten the restarting time by accurately performing restart of an engine through a starting apparatus in the case where while the vehicle reduces its speed, the engine is automatically stopped and then is restarted.

An engine automatic-stop/restart system according to the present invention automatically stops an engine when an automatic stopping condition is satisfied while a vehicle travels and then restarts the engine when a restarting condition is satisfied; the engine automatic-stop/restart system is characterized by including a starter motor that is energized to rotate; a pinion gear provided on the rotor shaft of the starter motor; a ring gear provided on the crankshaft of the engine; a solenoid that is energized to be biased; a plunger that pushes out the pinion gear in the axis direction thereof when the solenoid is energized, so that the pinion gear engages with the ring gear; a crank angle sensor that detects a crank angle of the engine and outputs a crank angle signal; a fuel injection device that injects fuel into the engine; a forward clutch that transmits torque produced by the engine to a transmission; a first control system that connects a power source with the starter motor in response to a first drive signal so as to energize the starter motor and connects the power source with the solenoid in response to a second drive signal so as to energize the solenoid; a second control system that controls the fuel injection device to make the fuel injection device inject fuel into the engine when the engine that has automatically stopped is restarted, that outputs the first drive signal to the first control system when the rotation speed of the engine is lower than a predetermined value, and that outputs the second drive signal to the first control system so as to energize the solenoid when the absolute value of a rotation-speed difference between an engine rotation speed calculated based on the cycle of the detected crank angle signal and the rotation speed of the pinion gear becomes smaller than a rotation speed difference threshold value at which the pinion gear and the ring gear can engage with each other; and a third control system that is configured in such a way as to control the coupling degree of the forward clutch so that the rotation speed of the engine can be controlled, when the engine, which cannot autonomously rotate only with fuel supply, is restarted and the rotation speed of an input shaft of the transmission is the same as or higher than the engine rotation speed, and that releases the forward clutch after the pinion gear and the ring gear have engaged with each other.

An engine automatic-stop/restart system according to the present invention is provided with a control system that automatically stops an engine when an automatic stopping condition is satisfied while a vehicle travels and then restarts the engine when a restarting condition is satisfied after the engine has automatically stopped; the engine automatic-stop/restart system includes a starter motor that is energized to rotate; a pinion gear provided on the rotor shaft of the starter motor; a ring gear provided on the crankshaft of the engine; a solenoid that is energized to be biased; a plunger that pushes out the pinion gear in the axis direction thereof when the solenoid is energized, so that the pinion gear engages with the ring gear; a crank angle sensor that detects a crank angle of the engine and outputs a crank angle signal; a fuel injection device that injects fuel into the engine; and a forward clutch that transmits torque produced by the engine to a transmission. The engine automatic-stop/restart system is characterized in that the control system makes the fuel injection device stop injection of the fuel so as to stop the engine, when the automatic stopping condition for the engine is satisfied; the control system makes the fuel injection device resume injection of the fuel, when there is satisfied the restart condition for the engine that has stopped; the control system energizes the starter motor when after injection of the fuel has resumed, starting of the engine is not completed; the control system controls the coupling degree of the forward clutch so as to control the rotation speed of the engine, when the engine cannot autonomously rotate only with fuel supply and the rotation speed of an input shaft of the transmission is the same as or higher than the engine rotation speed and is lower than a predetermined value; the control system energize the solenoid when the absolute value of a rotation-speed difference between an engine rotation speed calculated based on the cycle of the detected crank angle signal and the rotation speed of the pinion gear becomes smaller than a rotation speed difference threshold value at which the pinion gear and the ring gear can engage with each other; and the control system releases the forward clutch after the pinion gear and the ring gear have engaged with each other.

An engine automatic-stop/restart system according to the present invention is provided with a first control system that connects a power source with the starter motor in response to a first drive signal so as to energize the starter motor and connects the power source with the solenoid in response to a second drive signal so as to energize the solenoid; a second control system that controls the fuel injection device to make the fuel injection device inject fuel into the engine when the engine that has automatically stopped is restarted, that outputs the first drive signal to the first control system when the rotation speed of the engine is lower than a predetermined value, and that outputs the second drive signal to the first control system so as to energize the solenoid when the absolute value of a rotation-speed difference between an engine rotation speed calculated based on the cycle of the detected crank angle signal and the rotation speed of the pinion gear becomes smaller than a rotation speed difference threshold value at which the pinion gear and the ring gear can engage with each other; and a third control system that is configured in such a way as to control the coupling degree of the forward clutch so that the rotation speed of the engine can be controlled, when the engine, which cannot autonomously rotate only with fuel supply, is restarted and the rotation speed of an input shaft of the transmission is the same as or higher than the engine rotation speed, and that releases the forward clutch after the pinion gear and the ring gear have engaged with each other. As a result, the engine automatic-stop/restart system can shorten the restarting time by accurately performing restart of an engine through a starting apparatus in the case where while the vehicle reduces its speed, the engine is automatically stopped and then is restarted.

An engine automatic-stop/restart system according to the present invention is configured in such a way that the control system makes the fuel injection device stop injection of the fuel so as to stop the engine, when the automatic stopping condition for the engine is satisfied; the control system makes the fuel injection device resume injection of the fuel, when there is satisfied the restart condition for the engine that has stopped; the control system energizes the starter motor when after injection of the fuel has resumed, starting of the engine is not completed; the control system controls the coupling degree of the forward clutch so as to control the rotation speed of the engine, when the engine cannot autonomously rotate only with fuel supply and the rotation speed of an input shaft of the transmission is the same as or higher than the engine rotation speed and is lower than a predetermined value; and the control system energize the solenoid when the absolute value of a rotation-speed difference between an engine rotation speed calculated based on the cycle of the detected crank angle signal and the rotation speed of the pinion gear becomes smaller than a rotation speed difference threshold value at which the pinion gear and the ring gear can engage with each other. As a result, the engine automatic-stop/restart system can shorten the restarting time by accurately performing restart of an engine through a starting apparatus in the case where while the vehicle reduces its speed, the engine is automatically stopped and then is restarted.

The foregoing and other object, features, aspects, and advantages of the present invention will become more appar-

DETAILED DESCRIPTION OF THE PREFERRED EMBODIMENTS

Embodiment 1

Figure 1:
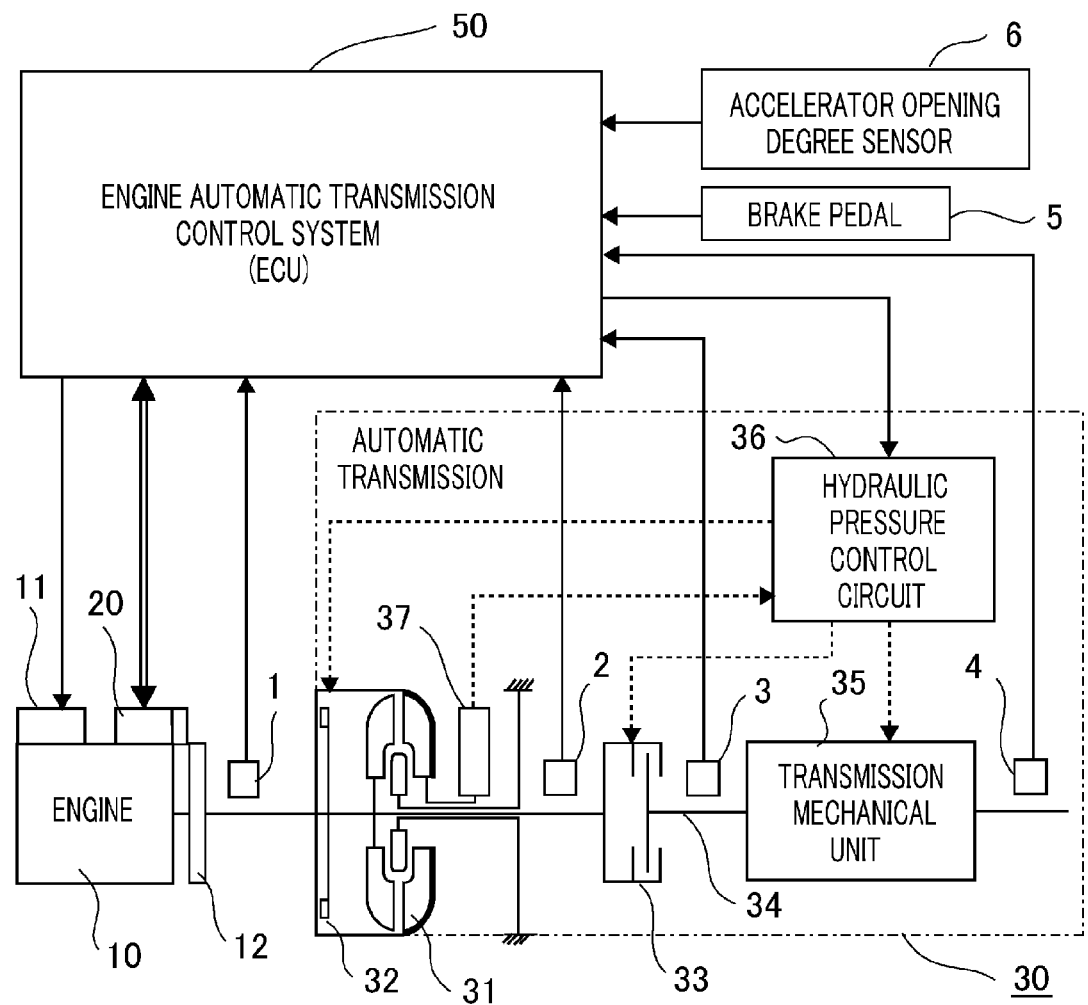
FIG. 1 is a block diagram illustrating the configuration of an engine automatic-stop/restart system according to Embodiment 1 of the present invention.
Figure 2:
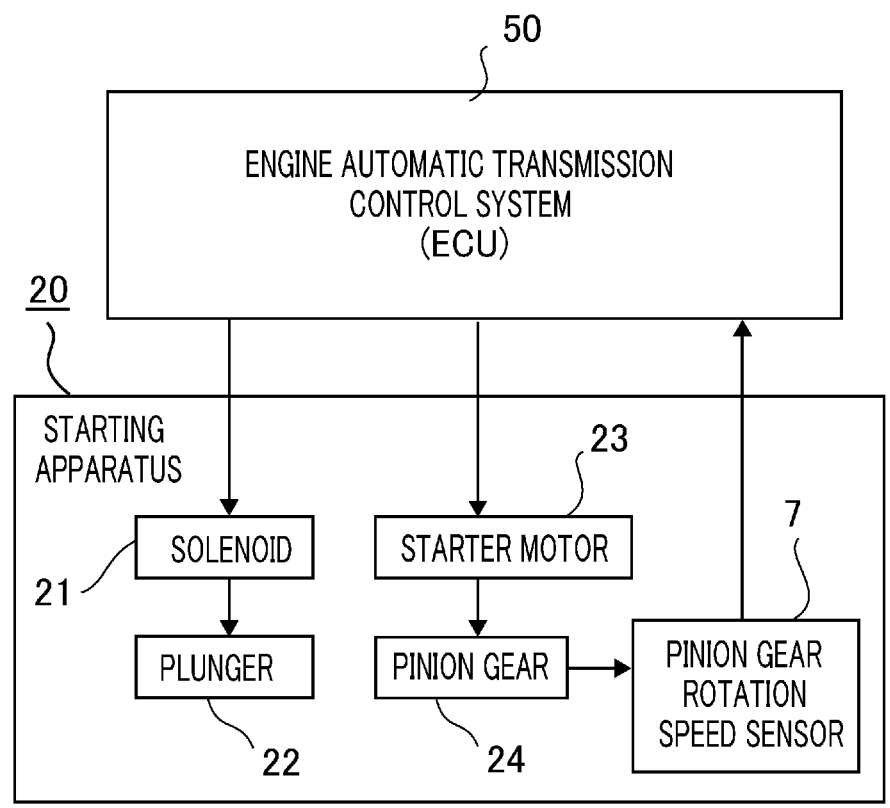
FIG. 2 is a block diagram illustrating the detailed configuration of a starting apparatus in an engine automatic-stop/restart system according to Embodiment 1 of the present invention.

Hereinafter, a preferred embodiment of an engine automatic-stop/restart system according to the present invention will be explained with reference to the drawings. FIG. 1 is a block diagram illustrating the configuration of an engine automatic-stop/restart system according to Embodiment 1 of the present invention; FIG. 2 is a block diagram illustrating the detailed configuration of a starting apparatus in an engine automatic-stop/restart system according to Embodiment 1 of the present invention. In FIGS. 1 and 2, an engine automatic-stop/restart system according to Embodiment 1 of the present invention is provided with an engine 10, a starting apparatus 20, an automatic transmission 30, and an engine automatic transmission control system 50 provided in an ECU (Electric Control Unit). A fuel injection device 11 provided in the engine 10 supplies a fuel to the engine 10. The starting apparatus 20 couples with the engine 10 is provided with a solenoid 21, a plunger 22, a starter motor 23, a pinion gear 24, and pinion gear rotation speed sensor 7.

The engine automatic transmission control system 50 controls the fuel injection device 11 that injects a fuel, and performs determination on an automatic stopping condition or a restarting condition so that a power source (unillustrated) such as a vehicle battery is connected with the starter motor 23 so as to energize the starter motor 23 or so that the power source is connected with the solenoid 21 so as to energize the solenoid 21.

The engine automatic transmission control system 50 is connected with an engine rotation speed sensor 1 that detects the rotation speed of the engine 10 and outputs an engine rotation signal, a turbine rotation speed sensor 2 that detects the turbine rotation speed of a torque converter 31 and outputs a turbine rotation speed, an input shaft rotation speed sensor 3 that detects an input shaft rotation speed to be inputted to a transmission mechanical unit 35 and outputs the input shaft rotation speed, a vehicle speed sensor 4 that detects the speed of a vehicle and outputs a vehicle speed signal, a brake pedal 5 that outputs a brake signal indicating the state of braking operation, an accelerator opening degree sensor 6 that detects an accelerator opening degree and outputs an accelerator opening degree signal, and the pinion gear rotation speed sensor 7.

The output of the engine 10 is inputted to the transmission mechanical unit 35 by way of the torque converter 31 provided in the automatic transmission 30, a lockup clutch 32, which is a directly-coupled transmission unit, a forward clutch 33, and an input shaft 34. A mechanical oil pump 37 provided in the automatic transmission 30 is driven in a rotary manner by the engine 10 so as to supply a hydraulic pressure to a hydraulic pressure control circuit 36. The hydraulic pressure control circuit 36 controls the hydraulic pressures for the torque converter 31, the forward clutch 33, and the transmission mechanical unit 35.

The engine automatic transmission control system 50 receives the vehicle speed signal from the vehicle speed sensor 4, the brake signal from the brake pedal 5, and the accelerator opening degree signal from the accelerator opening degree sensor 6, and controls the fuel injection device 11, based on these signals. The engine automatic transmission control system 50 receives the engine rotation signal from the engine rotation speed sensor 1, the turbine rotation speed signal from the turbine rotation speed sensor 2, and the input shaft rotation speed signal from the input shaft rotation speed sensor 3, and controls the automatic transmission 30, based on these signals.

The engine automatic transmission control system 50 is configured with various kinds of I/F circuits (unillustrated) and a microcomputer (unillustrated). The microcomputer is configured with an A/D converter (unillustrated) that converts analogue signals such as detection signals from the foregoing various kinds of sensors into digital signals; a CPU (unillustrated) that implements various kinds of programs such as an engine automatic-stop/restart control program and the like; a ROM (unillustrated) that stores the engine automatic-stop/restart control program, various kinds of control programs and control constants, and various kinds of tables; and a RAM (unillustrated) that stores variables and the like at times when various kinds control programs are implemented.

As illustrated in FIG. 2, the starting apparatus 20 includes the starter motor 23 that is energized to rotate, the pinion gear 24 provided on the rotor shaft of the starter motor 23, the plunger 22 for pushing the pinion gear 24 in the axis direction thereof so that the pinion gear 24 engages with the ring gear 12 provided on the crankshaft of the engine, and the solenoid 21 that is energized to move the plunger 22 so that the pinion gear 23 is pushed out in the center axis direction thereof.

Figure 3:
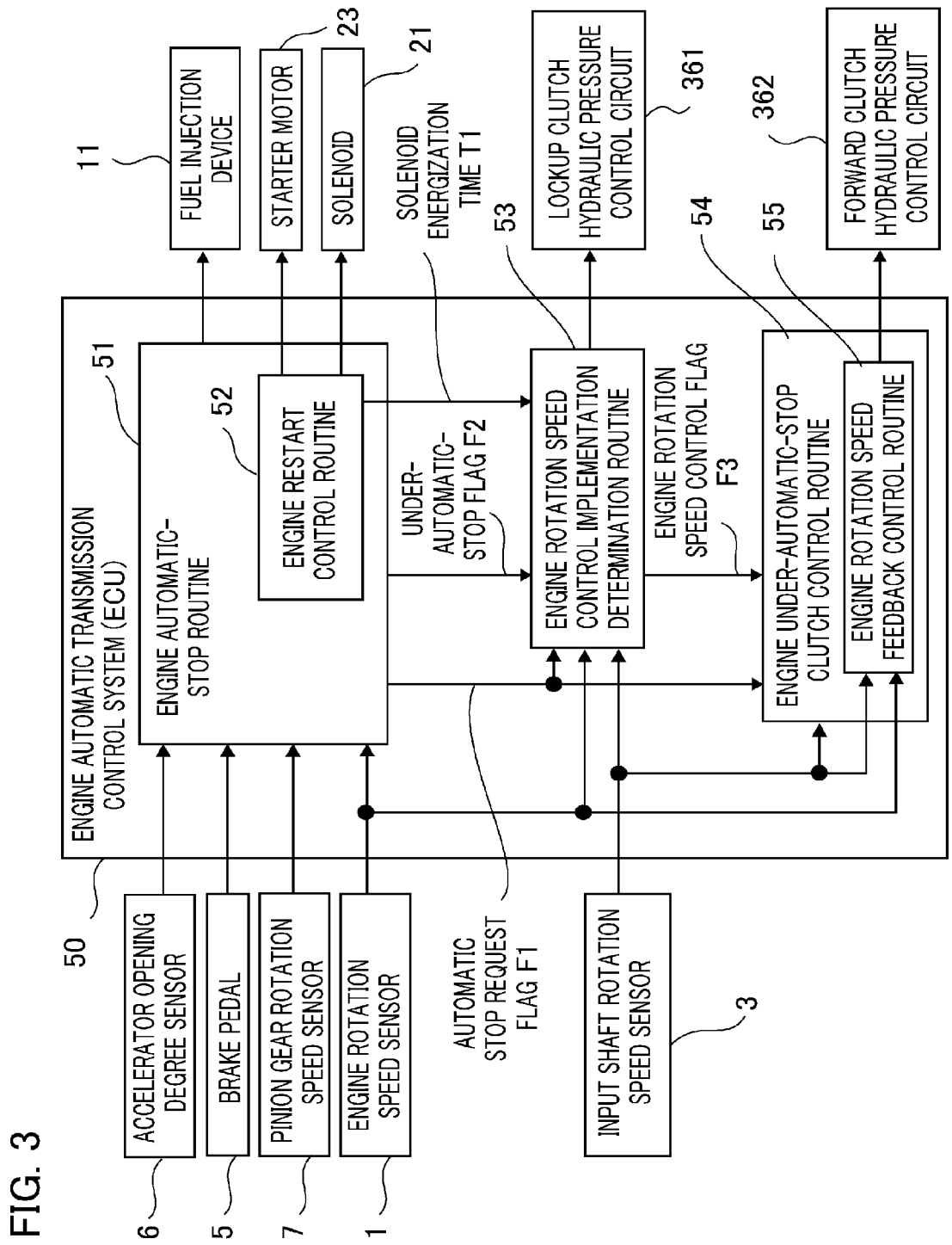
FIG. 3 is a block diagram illustrating the control in an engine automatic-stop/restart system according to Embodiment 1 of the present invention.

FIG. 3 is a block diagram illustrating the control in an engine automatic-stop/restart system according to Embodiment 1 of the present invention; the block diagram illustrates the configurations of various processing routines. In FIG. 3, in an engine automatic-stop routine 51 provided in the engine automatic transmission control system 50, at first, by utilizing information items from the vehicle speed sensor 4 (refer to FIG. 1), the brake pedal 5, and the accelerator opening degree sensor 6, determination on engine automatic stop is performed, and then the operation of the fuel injection device 11 is stopped. The engine automatic-stop routine 51 conveys an automatic stop request flag F1 indicating as to whether or not there exists an automatic stop request based on the determination on engine automatic stop to an engine rotation speed control implementation determination routine 53 and an engine under-automatic-stop clutch control routine 54.

Next, when determining, by utilizing information items from the brake pedal 5 and the accelerator opening degree sensor 6, that the engine restart condition has established, the engine automatic-stop routine 51 makes the engine restart control routine 52 energize and control the solenoid 21 and the starter motor 23 so as to restart the engine. The engine automatic-stop routine 51 corresponds to the first and second control systems according to the present invention.

Next, the engine rotation speed control implementation determination routine 53 determines whether or not engine rotation speed control can be implemented, based on information items from the engine rotation speed sensor 1 and the input shaft rotation speed sensor 3, information on an engine under-automatic-stop flag outputted by the engine automatic-stop routine 51, and information on a solenoid energization time for the solenoid 21 that is energized by the engine restart control routine 52. The engine rotation speed control implementation determination routine 53 makes a lockup clutch hydraulic pressure control circuit 361 provided in the hydraulic pressure control circuit 36 so as to control the hydraulic pressure for the lockup clutch 32.

By utilizing information on an engine rotation speed control flag F3 corresponding to the determination by the engine rotation speed control implementation determination routine 53 on whether or not the engine rotation speed control can be implemented and information items from the engine rotation speed sensor 1 and the input shaft rotation speed sensor 3, the engine under-automatic-stop clutch control routine 54 makes an engine rotation speed feedback control routine 55 operate a forward clutch hydraulic pressure control circuit 362 provided in the hydraulic pressure control circuit 36 so as to feedback-control the hydraulic pressure for the forward clutch 33. The engine under-automatic-stop clutch control routine 54 corresponds to the third control system according to the present invention.

Next, the operation of the engine automatic-stop/restart system according to Embodiment 1 of the present invention will be explained with reference to FIGS. 4 through 7. The processing items represented in these flowcharts are performed in a constant cycle of, for example, 5 [msec]. In FIGS. 4 through 7, the processing items in the steps S101 through S107, S201 through S208, S301 through S307, and S401 through S404 are performed according to the engine automatic-stop/restart control program stored in the ROM of the engine control system 50.

When the ignition switch of the vehicle is turned on, the engine automatic transmission control system 50 is supplied with electric power from the vehicle battery and starts its operation; then, the CPU formed of the microcomputer provided in the engine automatic transmission control system 50 implements, as follows, the engine automatic-stop/restart control program stored in the ROM.

Figure 4:
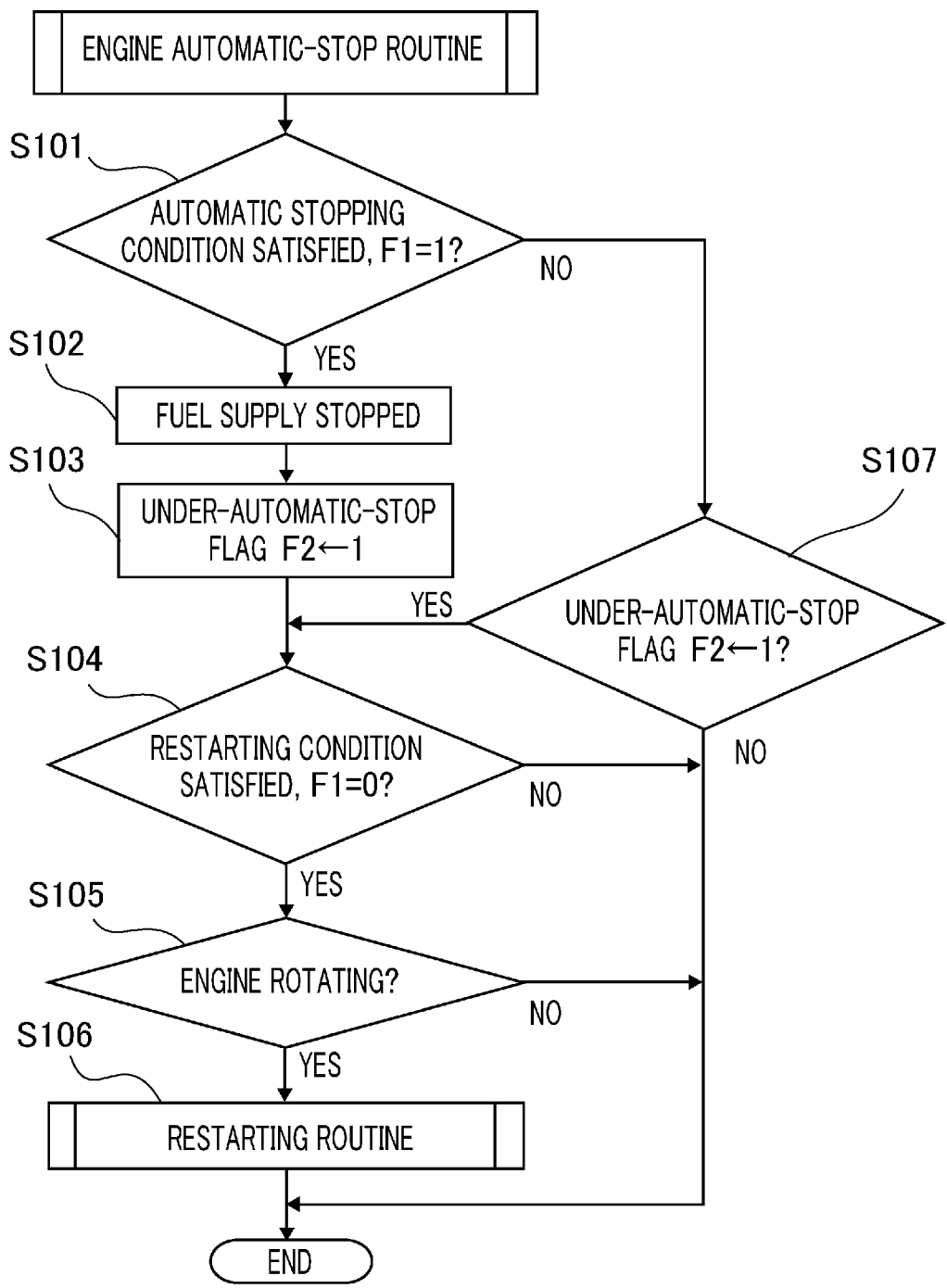
FIG. 4 is a flowchart representing an engine automatic-stop routine in an engine automatic-stop/restart system according to Embodiment 1 of the present invention.

At first, the engine automatic-stop routine will be explained. FIG. 4 is a flowchart representing an engine automatic-stop routine in an engine automatic-stop/restart system according to Embodiment 1 of the present invention; the flowchart represents the detail of the engine automatic-stop routine 51 in FIG. 3. In FIG. 4, in the step S101, the microcomputer of the engine automatic transmission control system 50 (simply referred to as the engine automatic transmission control system 50, hereinafter) determines whether or not the engine automatic stopping condition has been satisfied.

The automatic stopping condition is satisfied, for example, in an operation state where the vehicle speed is the same as or lower than 10 [km/h] and the driver is depressing the brake pedal 5. The vehicle speed is detected based on the vehicle speed signal outputted by the vehicle speed sensor 4, and the state where the brake pedal 5 is being depressed is detected through the fact that the brake signal from the brake pedal 5 is "ON". When the automatic stopping condition is satisfied based on these signals, an engine automatic stop request flag F1 is set to "1". Accordingly, in the step S101, it is determined whether or not the engine automatic stop request flag F1 is "1".

In the case where it is determined in the step S101 that the engine automatic stop request flag F1 is "1", i.e., the engine automatic stopping condition has been satisfied (YES), the step S101 is followed by the step S102; in contrast, in the case where it is determined that the engine automatic stop request flag F1 is not "1", i.e., the engine automatic stopping condition has not been satisfied (NO), the step S101 is followed by the step S107.

In the step S102, the engine automatic transmission control system 50 controls the fuel injection device 11 in such a way that the fuel injection device 11 stops fuel supply to the engine 10.

Next, in the step S103, the engine automatic transmission control system 50 sets an under-automatic-stop flag F2 to "1".

Next, in the step S104, the engine automatic transmission control system 50 determines whether or not the engine restart condition has been satisfied. The restarting condition is satisfied, for example, in an operation state where the driver has released the brake pedal and the driver is depressing the accelerator pedal. The operation state where the brake pedal 5 is released is based on a state where the brake signal outputted from the brake pedal 5 is "OFF"; the operation state where the accelerator pedal is being depressed is based on the accelerator opening degree signal outputted from the accelerator opening degree sensor 6. When the restarting condition is satisfied, the engine automatic stop request flag F1 has been cleared to "0". Accordingly, in the step S104, it is determined whether or not the engine automatic stop request flag F1 has been set to "0".

In the case where it is determined in the step S104 that the engine automatic stop request flag F1 is "0", i.e., the restarting condition has been satisfied (YES), the step S101 is followed by the step S105; in the case where it is determined that the engine automatic stop request flag F1 is not "0", i.e., the restarting condition has not been satisfied (NO), the engine automatic-stop routine is ended.

In the step S105, the engine automatic transmission control system 50 determines whether or not the engine 10 is rotating. In the case where the engine 10 is rotating (YES), the step 105 is followed by the step 106; in the case where the engine 10 is not rotating, i.e., the engine 10 is at a complete standstill (NO), the engine automatic-stop routine is ended.

Next, in the step S106, the engine automatic transmission control system 50 implements the restarting control routine represented in FIG. 5, described later.

In the case where it is determined in the step S101 that the engine automatic stop request flag F1 is not "1", i.e., the engine automatic stopping condition has not been satisfied (NO) and then the step S101 is followed by the step S107, the engine automatic transmission control system 50 determines whether or not the under-automatic-stop flag F2 is "1". In the case where the under-automatic-stop flag F2 is "1" (YES), it is determined that the engine 10 is in the automatic stop mode, and the step S107 is followed by the step S104, where it is determined whether or not the restarting condition has been satisfied. In contrast, in the case where the under-automatic-stop flag F2 is "0" (NO), it is determined that the engine is not in the automatic stop mode, and then the engine automatic-stop routine is ended.

Next, there will be explained the implementation of the engine restart control routine performed in the step S106. FIG. 5 is a flowchart representing the engine restart control routine in an engine automatic-stop/restart system according to Embodiment 1 of the present invention; the flowchart represents the detail of the engine restart control routine 52 in FIG. 3. That is to say, in FIG. 5, in the step S201, the engine automatic transmission control system 50 controls the fuel injection device 11 in such a way that the fuel injection device 11 injects a starting fuel into the engine 10.

Figure 9:
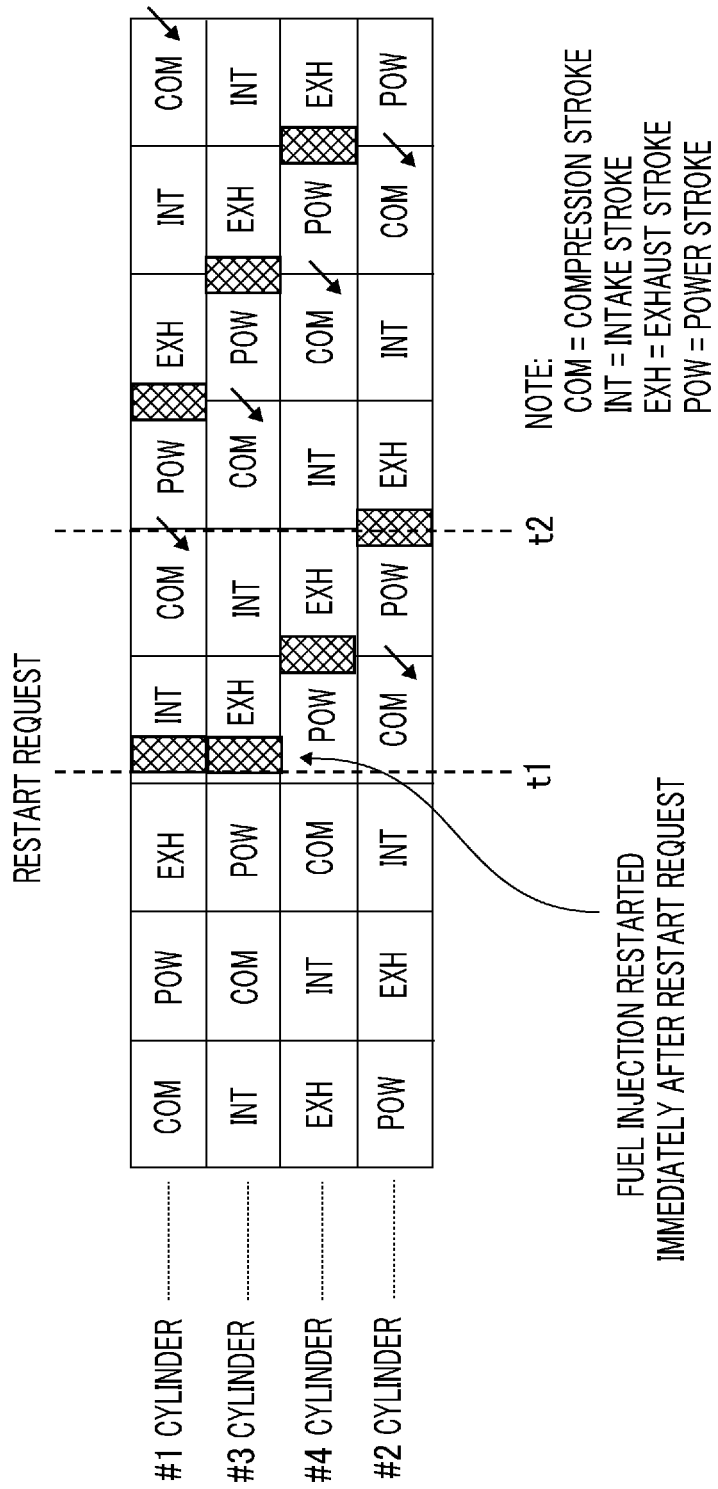
FIG. 9 is a chart representing an engine-restart fuel injection in an engine automatic-stop/restart system according to Embodiment 1 of the present invention.

Here, there will be explained fuel injection at a time when the engine 10 is restarted. FIG. 9 is a chart representing an engine-restart fuel injection in an engine automatic-stop/restart system according to Embodiment 1 of the present invention. FIG. 9 represents a case where the engine 10 has four cylinders; in the chart, the arrows each denote ignition timings. While the engine is in the automatic stopping mode, ignition is interrupted; then, after engine restarting has begun, ignition is resumed at a predetermined timing (at the crank angle BTDC 5° of each compression-stroke cylinder). The hatched portions indicate the timings for fuel ignition. While the engine is in the automatic stopping mode, fuel injection is interrupted; at a time instant t1 when the restarting request is issued, at approximately the same time, there is resumed fuel injection in a plurality of predetermined cylinders, i.e., in #1 cylinder in the intake stroke and #3 cylinder in the exhaust stroke, in the case of FIG. 9; after that, fuel injection is resumed at a predetermined timing (at the crank angle BTDC 5° of each power-stroke cylinder). After the restarting has begun, the fuel that has been injected into #1 cylinder and #3 cylinder at approximately the same time starts to burn in #1 cylinder due to ignition resumed at a time instant t2 in FIG. 9.

Figure 5:
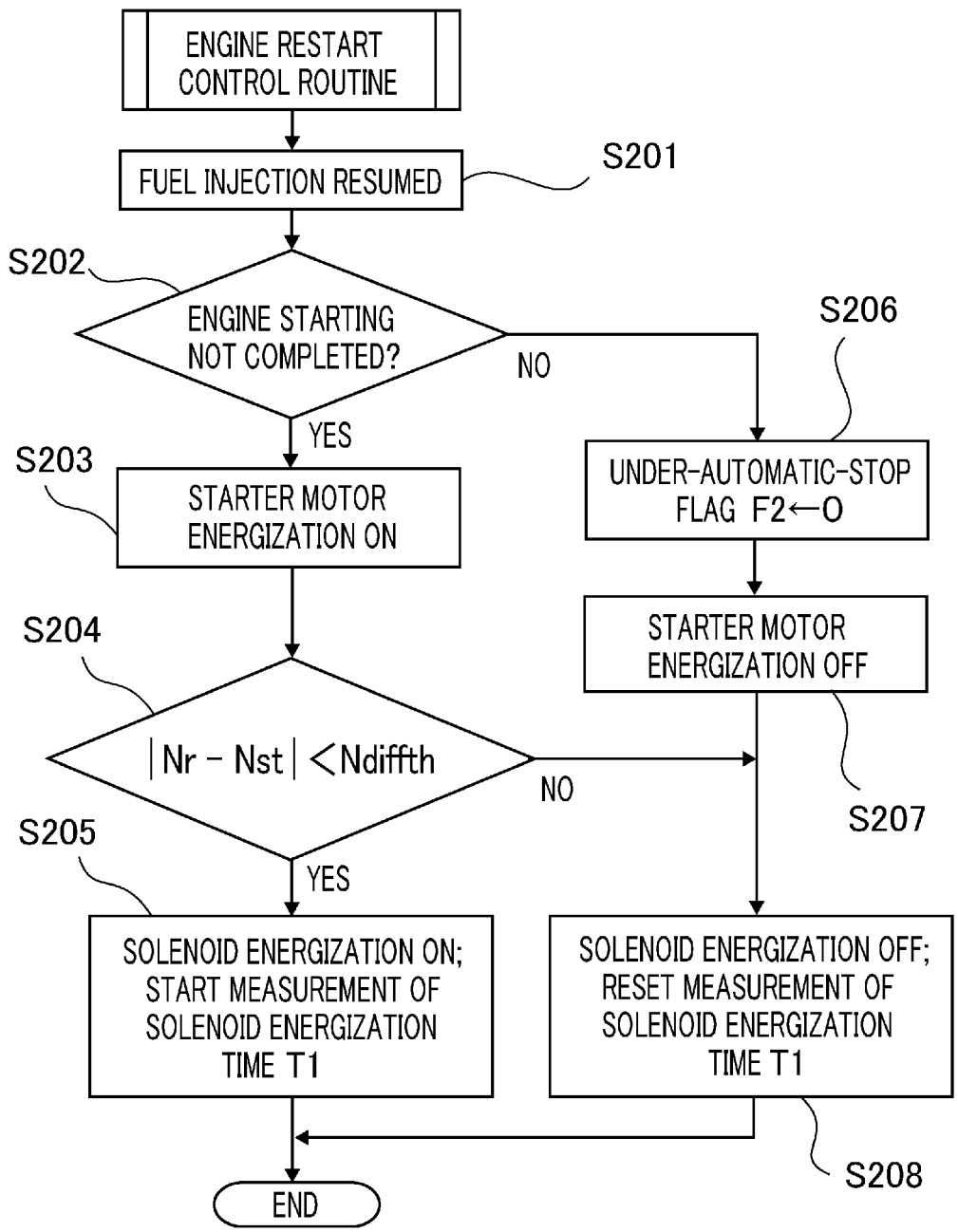
FIG. 5 is a flowchart representing an engine restart control routine in an engine automatic-stop/restart system according to Embodiment 1 of the present invention.

Again in FIG. 5, in the step S202, the engine automatic transmission control system 50 determines, based on the engine rotation speed, whether or not the engine 10 has started. In the case where the engine 10 has not started, i.e., in the case where the engine rotation speed is lower than a predetermined value (YES), the step 202 is followed by the step S203. In contrast, in the case where the engine 10 has started, i.e., in the case where the engine rotation speed is the same as or higher than the predetermined value (NO), it is determined that the engine 10 has started through burning; then, the step 202 is followed by the step S206. In this embodiment, the predetermined value of the engine rotation speed with which it is determined whether or not the engine has started is, for example, 600 [rpm].

Next, in the step S203, the engine automatic transmission control system 50 energizes the starter motor 23 so as to make the pinion gear 24 rotate.

Next, in the step S204, the engine automatic transmission control system 50 determines whether or not the absolute value Ndiff of the rotation speed difference between the engine rotation speed Nr and the pinion gear rotation speed Nst is smaller than a rotation speed difference threshold value Ndiffth. In the case where the absolute value Ndiff is smaller than the rotation speed difference threshold value Ndiffth (YES), the step S204 is followed by the step S205; in the case where the absolute value Ndiff is the same as or larger than the rotation speed difference threshold value Ndiffth (NO), the step S204 is followed by the step S208. In this embodiment, the rotation speed difference threshold value Ndiffth is a value, for example, 50 [rpm] with which the pinion gear 24 and the ring gear 12 can engage with each other.

In general, the number of teeth of the pinion gear 24 is smaller than that of the ring gear 12; in order to avoid confusion, values obtained by converting the engine rotation speed Nr and the pinion gear rotation speed Nst into the rotation speeds at the ring gear 12, in consideration of the ratio of the number of teeth of the pinion gear 24 to that of the ring gear 12.

Next, in the step S205, the engine automatic transmission control system 50 energizes the solenoid 21. Moreover, the engine automatic transmission control system 50 starts to measure the energization time for the solenoid 21 and ends the implementation of the engine restart control routine.

In contrast, in the case where in the step S202, it is determined that the engine has been started (NO) and then the step S202 is followed by the step S206, the engine automatic transmission control system 50 sets, in the step S206, the under-automatic-stop flag F2 to "0" because the engine has been restarted.

Next, in the step S207, the engine automatic transmission control system 50 de-energizes the starter motor 23 of the starting apparatus 20.

Next, in the step S208, the engine automatic transmission control system 50 de-energizes the solenoid 21 of the starting apparatus 12. Moreover, the engine automatic transmission control system 50 ends and resets the measurement of the energization time for the solenoid 21. In this case, because no attractive force is exerted between the solenoid 21 and the plunger 22, the plunger 22 does not move in the axis direction of the rotor shaft of the starter motor 23; therefore, the pinion gear 24 is not pushed out in the axis direction thereof, whereby the pinion gear 24 and the ring gear 12 do not engage with each other.

Figure 6:
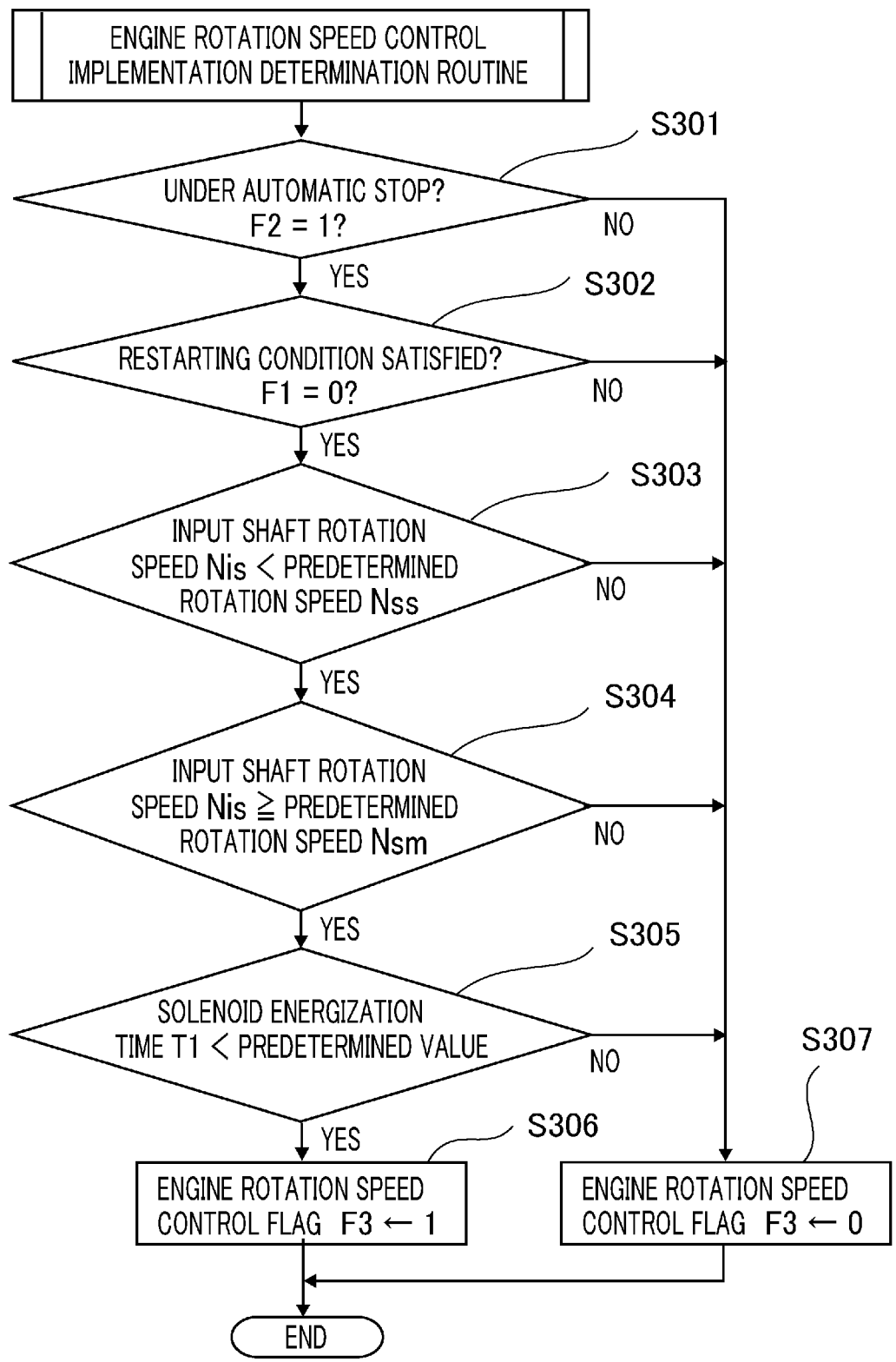
FIG. 6 is a flowchart representing an engine rotation speed control implementation determination routine in an engine automatic-stop/restart system according to Embodiment 1 of the present invention.

Next, implementation of the engine rotation speed control implementation determination routine will be explained. FIG. 6 is a flowchart representing an engine rotation speed control implementation determination routine in an engine automatic-stop/restart system according to Embodiment 1 of the present invention; the flowchart represents the detail of the engine rotation speed control implementation determination routine in FIG. 3. In FIG. 6, in the step S301, the engine automatic transmission control system 50 determines whether or not the under-automatic-stop flag F2 is "1". In the case where the under-automatic-stop flag F2 is "1" (YES), it is determined that the engine 10 is in the automatic stop mode, and the step S301 is followed by the step 302, where it is determined whether or not the engine is being restarted. In contrast, in the case where the under-automatic-stop flag F2 is "0" (NO), it is determined that the engine is not in the automatic stop mode, and then the step S301 is followed by the step S307.

Next, in the step S302, in order to determine whether or not the engine restart condition has been satisfied, the engine automatic transmission control system 50 determines whether or not the engine automatic stop request flag F1 is "0". In the case where the engine automatic stop request flag F1 is "0" (YES), it is determined that the engine is being restarted; then, the step S302 is followed by the step S303. In the case where the engine automatic stop request flag F1 is "1" (NO), it is determined that the engine is not being restarted; then, the step S302 is followed by the step S307.

Next, in the step S303, the engine automatic transmission control system 50 determines whether or not the input shaft rotation speed Nis is lower than a preliminarily set, predetermined rotation speed Nss. In the case where the input shaft rotation speed Nis is lower than the predetermined rotation speed Nss (YES), it is determined that it is required to restart the engine by the starting apparatus when the engine is restarted; then, the step S303 is followed by the step S304. In the case where the input shaft rotation speed Nis is the same as or higher than the predetermined rotation speed Nss (NO), it is determined that when the engine is restarted, the engine autonomously rotates to restart; then, the step S303 is followed by the step S307. In this embodiment, the preliminarily set, predetermined rotation speed Nss is, for example, 600 [rpm] at which the engine autonomously rotates to restart only through fuel injection.

Next, in the step S304, the engine automatic transmission control system 50 determines whether or not the input shaft rotation speed Nis is the same as or higher than a preliminarily set, predetermined rotation speed Nsm. In the case where the input shaft rotation speed Nis is the same as or higher than the predetermined rotation speed Nsm (YES), it is determined that control of the forward clutch 33 makes it possible to maintain the engine rotation speed at the predetermined rotation speed Nsm or higher; then, the step S304 is followed by the step S305. In the case where the input shaft rotation speed Nis is lower than the predetermined rotation speed Nsm (NO), it is determined that control of the forward clutch 33 does not make it possible to maintain the engine rotation speed at the predetermined rotation speed Nsm or higher; then, the step S304 is followed by the step S307. In this embodiment, the preliminarily set, predetermined rotation speed Nsm, which is the maximum rotation speed of the starter motor, is for example, 300 [rpm].

Next, in the step S305, the engine automatic transmission control system 50 determines whether or not the solenoid energization time T1 is smaller than a preliminarily set, predetermined value. In the case where the solenoid energization time T1 is smaller than the preliminarily set, predetermined value (YES), it is determined that the pinion gear 24 has not engaged with the ring gear 12; then, the step S305 is followed by the step S306. In the case where the solenoid energization time T1 is the same as or longer than the preliminarily set, predetermined value (NO), it is determined that the pinion gear 24 has engaged with the ring gear 12; then, the step S305 is followed by the step S307. In this embodiment, the preliminarily set, predetermined value, which is a time from a time instant when the solenoid energization is started to a time instant when the pinion gear 24 engages with the ring gear 12, is, for example, 50 [ms].

Next, in the step S306, the engine automatic transmission control system 50 sets the engine rotation speed control flag F3 to "1" and ends the implementation of the engine rotation speed control implementation determination routine.

In the case where the step S305 is followed by the step S307, the engine automatic transmission control system 50 sets the engine rotation speed control flag F3 to "0" and ends the implementation of the engine rotation speed control implementation determination routine.

Figure 7:
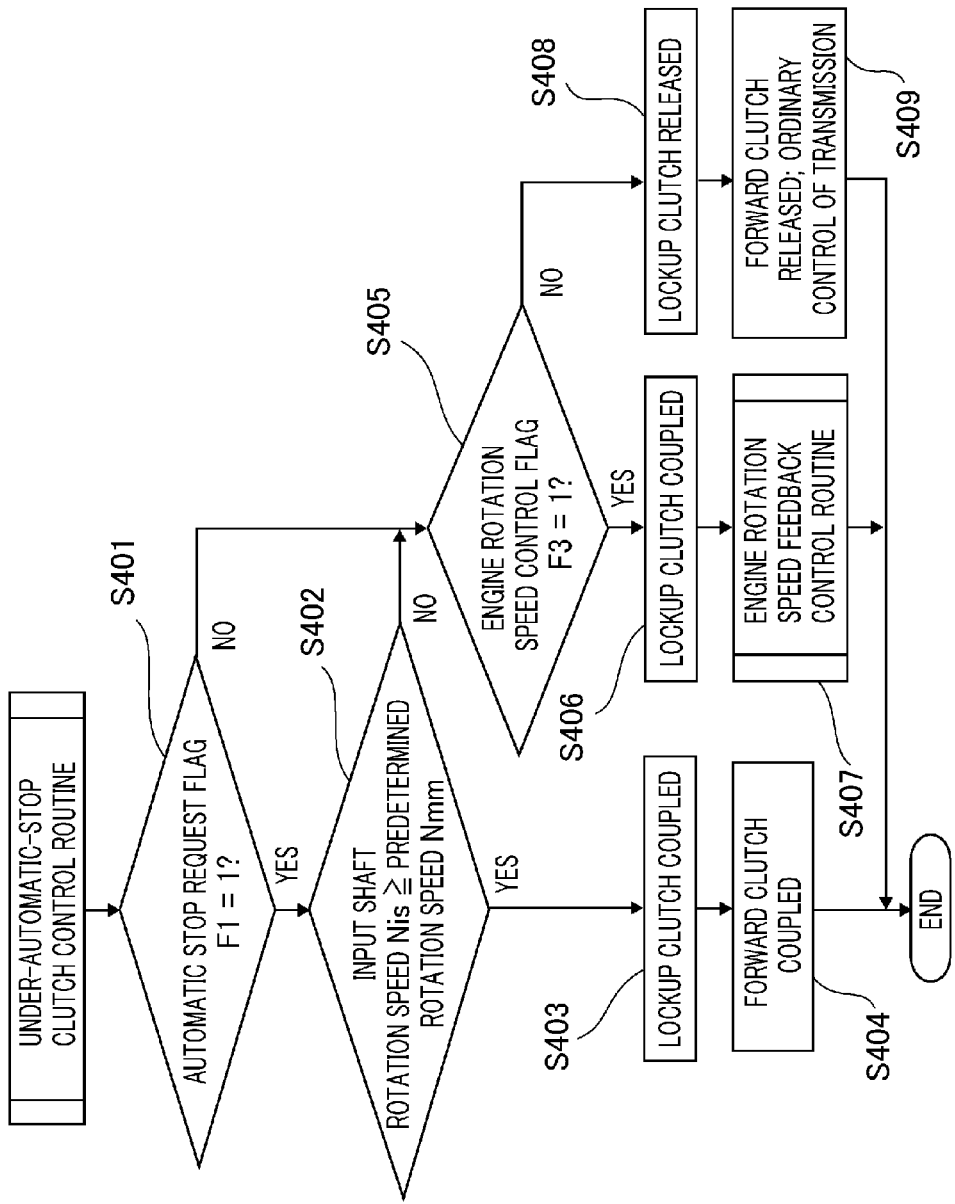
FIG. 7 is a flowchart representing an under-automatic-stop clutch control routine in an engine automatic-stop/restart system according to Embodiment 1 of the present invention.

Next, the under-automatic-stop clutch control routine will be explained. FIG. 7 is a flowchart representing the under-automatic-stop clutch control routine in an engine automatic-stop/restart system according to Embodiment 1 of the present invention; the flowchart represents the detail of the engine under-automatic-stop clutch control routine in FIG. 3. In FIG. 7, in the step S401, the engine automatic transmission control system 50 determines whether or not the automatic stop request flag F1 is "1". In the case where the automatic stop request flag F1 is "1" (YES), i.e., in the case where the engine is in the automatic stop mode, the step S401 is followed by the step S402. In the case where the automatic stop request flag F1 is "0" (NO), i.e., in the case where the engine is restarted, the step S401 is followed by the step S405.

Next, in the step S402, the engine automatic transmission control system 50 determines whether or not the input shaft rotation speed Nis is the same as or higher than a preliminarily set, predetermined rotation speed Nmm. In the case where the input shaft rotation speed Nis is the same as or higher than the predetermined rotation speed Nmm (YES), the step S402 is followed by the step S403. In the case where the input shaft rotation speed Nis is lower than the predetermined rotation speed Nmm (NO), the step S402 is followed by the step S405. In this embodiment, the predetermined rotation speed Nmm, at which no uncomfortable vibration is produced when the wheel axle and the engine is directly coupled with each other, is, for example, 200 [rpm].

Next, in the step S403, the engine automatic transmission control system 50 performs coupling of the lockup clutch 32; then, the step 403 is followed by the step S404.

Next, in the step S404, the engine automatic transmission control system 50 performs coupling of the forward clutch 33 and ends the implementation of the under-automatic-stop clutch control routine.

In the case where the step S405 follows the step S401 or the step S402, the engine automatic transmission control system determines in the step S405 whether or not the engine rotation speed control flag F3 is "1". In the case where the engine rotation speed control flag F3 is "1" (YES), i.e., in the case where the engine rotation speed control is implemented, the step S405 is followed by the step S406. In the case where the engine rotation speed control flag F3 is "0" (NO), i.e., in the case where the engine rotation speed control is not implemented, the step S405 is followed by the step S408.

Next, in the step S406, the engine automatic transmission control system 50 performs coupling of the lockup clutch 32; then, the step 406 is followed by the step S407.

Figure 8:
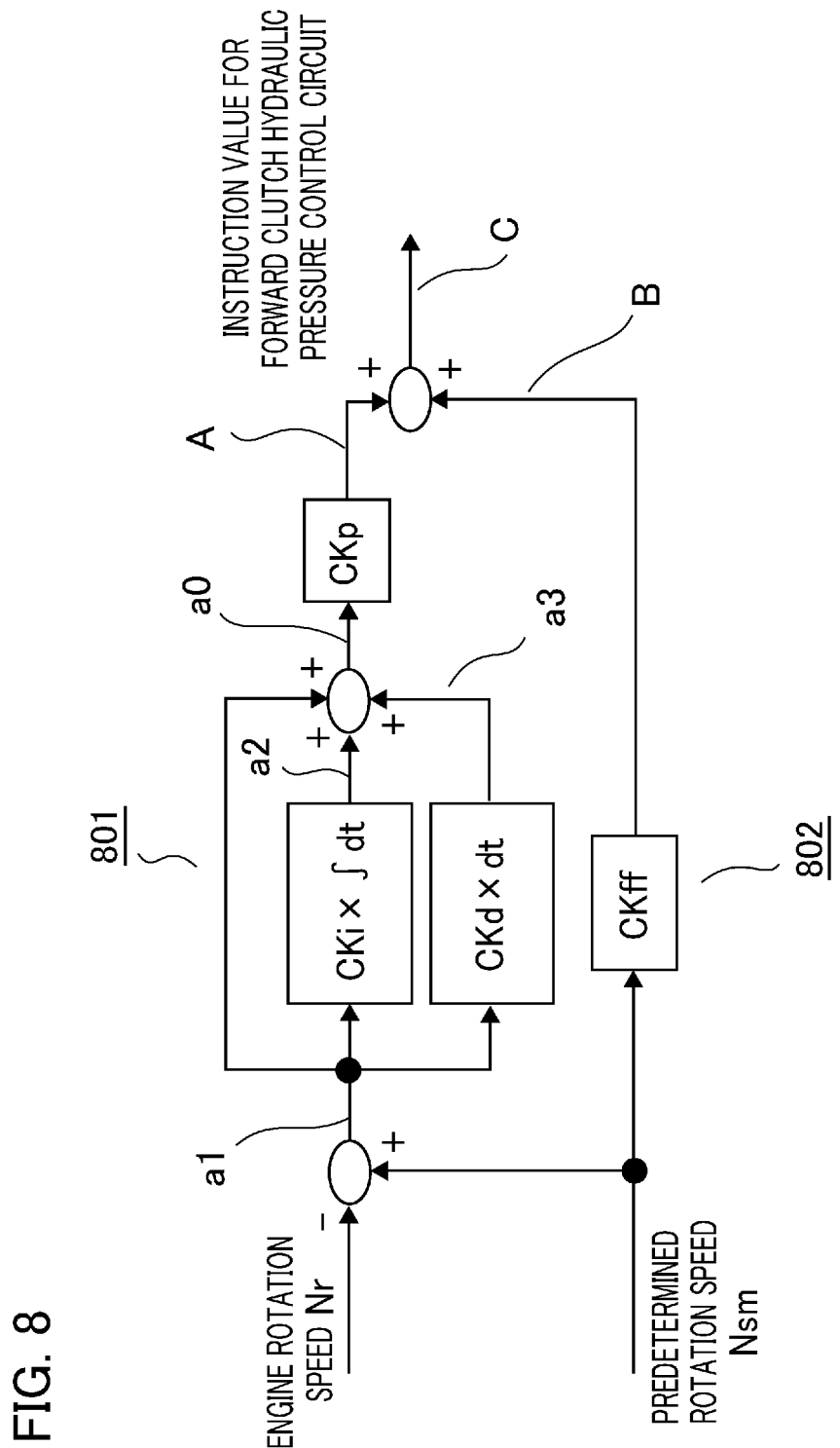
FIG. 8 is a block diagram illustrating the operation of an engine automatic-stop/restart system according to Embodiment 1 of the present invention.

Next, in the step S407, the engine automatic transmission control system 50 calculates a hydraulic pressure control instruction value for controlling the forward clutch 33 by use of the forward clutch hydraulic pressure control circuit 362 in the hydraulic pressure control circuit 36, based on an engine rotation speed feedback routine, represented in the block diagram in FIG. 8, utilizing the engine rotation speed Nr and a preliminarily set, predetermined rotation speed Nsm, which is a desired engine rotation speed Nsm, so that engine rotation speed Nr becomes the predetermined rotation speed Nsm. The detail of the engine rotation speed feedback routine in FIG. 8 will be described later.

Next, in the case where the step S405 is followed by the step S408, the engine automatic transmission control system 50 releases the lockup clutch 32; then, the step 408 is followed by the step S409.

Next, in the step S409, the engine automatic transmission control system 50 releases the forward clutch 33 so as to move the control of the automatic transmission to the ordinary control, and ends the implementation of the under-automatic-stop clutch control routine.

Next, there will be explained the engine rotation speed feedback routine in the step S407, described above. FIG. 8 is a block diagram illustrating the operation of an engine automatic-stop/restart system according to Embodiment 1 of the present invention; the block diagram illustrates the engine rotation speed feedback control in the step S407. Also in the block diagram in FIG. 8, programs are implemented according to the engine automatic-stop/restart control program in the ROM of the engine control system 50.

The engine rotation speed feedback routine is configured with a feedback control unit 801 that calculates a control output value by use of a PID controller, based on the difference between the engine rotation speed Nr and the predetermined rotation speed Nsm; and a feed-forward control unit 802 that calculates a control output value by multiplying the predetermined rotation speed Nsm by a gain. A final instruction value for the forward clutch hydraulic pressure control circuit 362 of the hydraulic pressure control circuit 36 that controls the forward clutch 33 is obtained by adding the output of the feedback control unit 801 and the output of the feed-forward control unit 802.

Here, the feedback control unit 801 will be explained in detail. The feedback control unit 801 calculates and outputs a value A that is obtained by multiplying by a gain CKp the total sum a0 of the difference a1 between the engine rotation speed Nr and the second predetermined rotation speed Nsm, a value a2 obtained by multiplying the integration value of the difference a1 by a gain CKi, and a value a3 obtained by multiplying the differential value of the difference a1 by a gain CKd. The gains CKi, CKd, and CKp are values that are preliminarily obtained through vehicle experiments.

Next, the feed-forward control unit 802 will be explained in detail. The feed-forward control unit 802 outputs a value B that is obtained by multiplying the predetermined rotation speed Nsm by a gain CKff. The gains CKi, CKd, and CKp are values that are preliminarily obtained through a vehicle experiment or the like. An instruction value C for the forward clutch hydraulic pressure control circuit 362 that controls the forward clutch 33 is calculated as a sum of the output A of the feedback control unit 801 and the output B of the feed-forward control unit 802.

Figure 10:
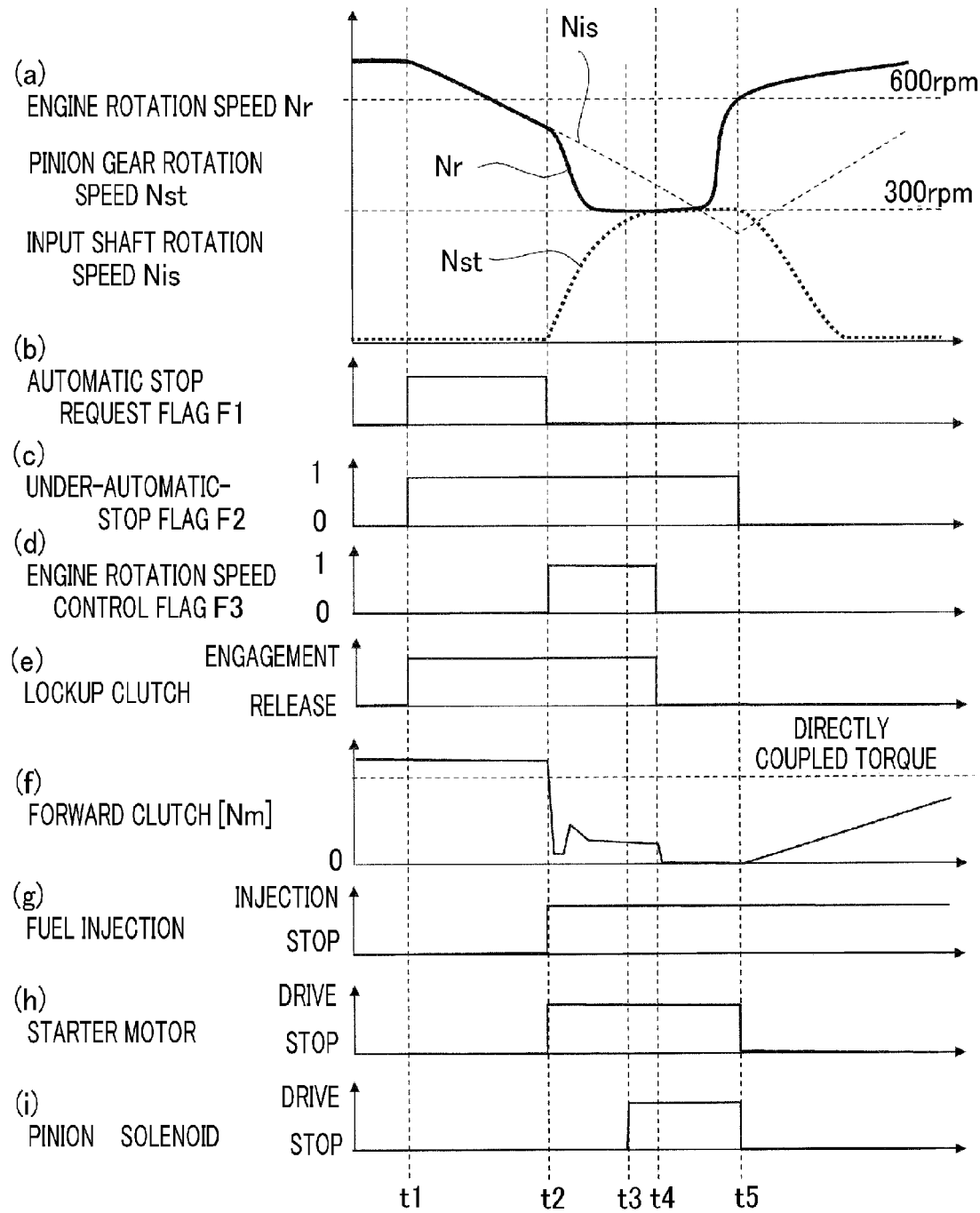
FIG. 10 is a timing chart representing the post-restart operation of an engine in an engine automatic-stop/restart system according to Embodiment 1 of the present invention.

Next, the operation of the engine automatic-stop/restart system will be explained along the time instants in a timing chart. FIG. 10 is a timing chart representing the post-restart operation of an engine in an engine automatic-stop/restart system according to Embodiment 1 of the present invention; the timing chart represents the operation performed in the case where the engine is automatically stopped when the vehicle is travelling, the pinion gear 24 and the ring gear 12 are engaged with each other while the engine rotates, and then the engine is restarted through cranking by the starter motor 23.

In FIG. 10, FIG. 10(a) represents the temporal transitions of the engine rotation speed Nr, the starter motor rotation speed, i.e., the pinion gear rotation speed Nst, and the input shaft rotation speed Nis of the transmission. FIG. 10(b) represents the state of the automatic stop request flag F1; in the case where the automatic stopping condition is satisfied, the automatic stop request flag F1 is set to "1", and in the case where the restarting condition is satisfied, the automatic stop request flag F1 is reset to "0". FIG. 10(c) represents the state of the under-automatic-stop flag F2; in the case where the engine 10 is in the automatic stop mode, the under-automatic-stop flag F2 is set to "1", and in the case where the engine 10 has been started, the under-automatic-stop flag F2 is reset to "0".

FIG. 10(d) represents the temporal transition of the engine rotation speed control flag F3; FIG. 10(e) represents the temporal transition of the coupling-release state of the lockup clutch of the automatic transmission. FIG. 10(f) represents the temporal transition of the coupling torque of the forward clutch of the automatic transmission. FIG. 10(g) represents the temporal transition of the injection/non-injection state of fuel injection. FIG. 10(h) represents the temporal transition of the energization state of the starter motor 23. FIG. 10(i) represents the temporal transition of the energization state of the solenoid 21, i.e., the driving state of the pinion.

In FIG. 10, at first, in the case where the automatic stopping condition is satisfied at a time instant t1 while the vehicle travels, the automatic stop request flag F1 represented in FIG. 10(b) is set to "1"; after fuel injection stops, the under-automatic-stop flag F2 represented in FIG. 10(c) is set to "1" (refer to steps S101 through S103 in FIG. 4). In this situation, in order to maintain the engine rotation speed Nr, the lockup clutch 32 and the forward clutch 33 are coupled with each other so that the engine and the vehicle axle are directly coupled with each other (refer to the steps S401 through S404 in FIG. 7).

Next, when the restarting condition is satisfied at a time instant t2 when the engine rotation speed is lower than a predetermined rotation speed Nss (600 [rms]) at which the engine can autonomously rotate only through fuel injection, the automatic stop request flag F1 represented in FIG. 10(c) becomes "0", and fuel injection is resumed; at the same time, because the engine 10 has not completely started, the starter motor 23 is energized and starts to rotate (refer to steps S201 through S203 in FIG. 5). When the restarting condition is satisfied at the time instant t2, the input shaft rotation speed Nis is the same as or higher than the predetermined rotation speed Nsm (300 [rms]); therefore, the engine rotation speed control flag F3 is set to "1", and in the under-automatic-stop clutch control routine, the coupling torque of the forward clutch is adjusted in such a way that the engine rotation speed becomes equal to the predetermined rotation speed Nsm (refer to the steps S401, and S405 through S407 in FIG. 7).

Next, at a time instant t3 when the absolute value Ndiff of the rotation speed difference between the engine rotation speed Nr and the pinion gear rotation speed Nst becomes smaller than the rotation speed difference threshold value Ndiffth at which the pinion gear 24 and the ring gear 12 can engage with each other, the solenoid 21 is energized and pushes out the pinion gear 24, and then the pinion gear 24 and the ring gear 12 start to engage with each other (refer to the step S205 in FIG. 5).

Then, at a time instant t4, the engine rotation speed Nr and the starter motor rotation speed, i.e., the pinion gear rotation speed Nst synchronize with each other, so that the pinion gear 24 and the ring gear 12 completely engage with each other. As can be seen here, there occurs a time lag, i.e., a period from the time instant 3 when the pinion gear 24 starts to move in the axis direction thereof so as to start the engagement between the pinion gear 24 and the ring gear 12 to the time instant t4 when the pinion gear 24 and the ring gear 12 completely engage with each other and the pinion gear 24 completes its movement. When the pinion gear 24 and the ring gear 12 completely engage with each other, the engine rotation speed control flag F3 becomes "0" so that the reverse torque from the vehicle axle is not transmitted to the engine (refer to the steps S305 through S307 in FIG. 6); the lockup clutch 32 and the forward clutch 33 are released; then, the ordinary control is resumed (refer to the steps S408 through S409).

Then, at a time instant t5, due to combustion of the fuel, the engine rotation speed becomes the same as or higher than an engine starting completion determination rotation speed (600 [rpm]); the engine has been restarted; then, the starter motor 23 and the solenoid 21 are de-energized.

Figure 11:
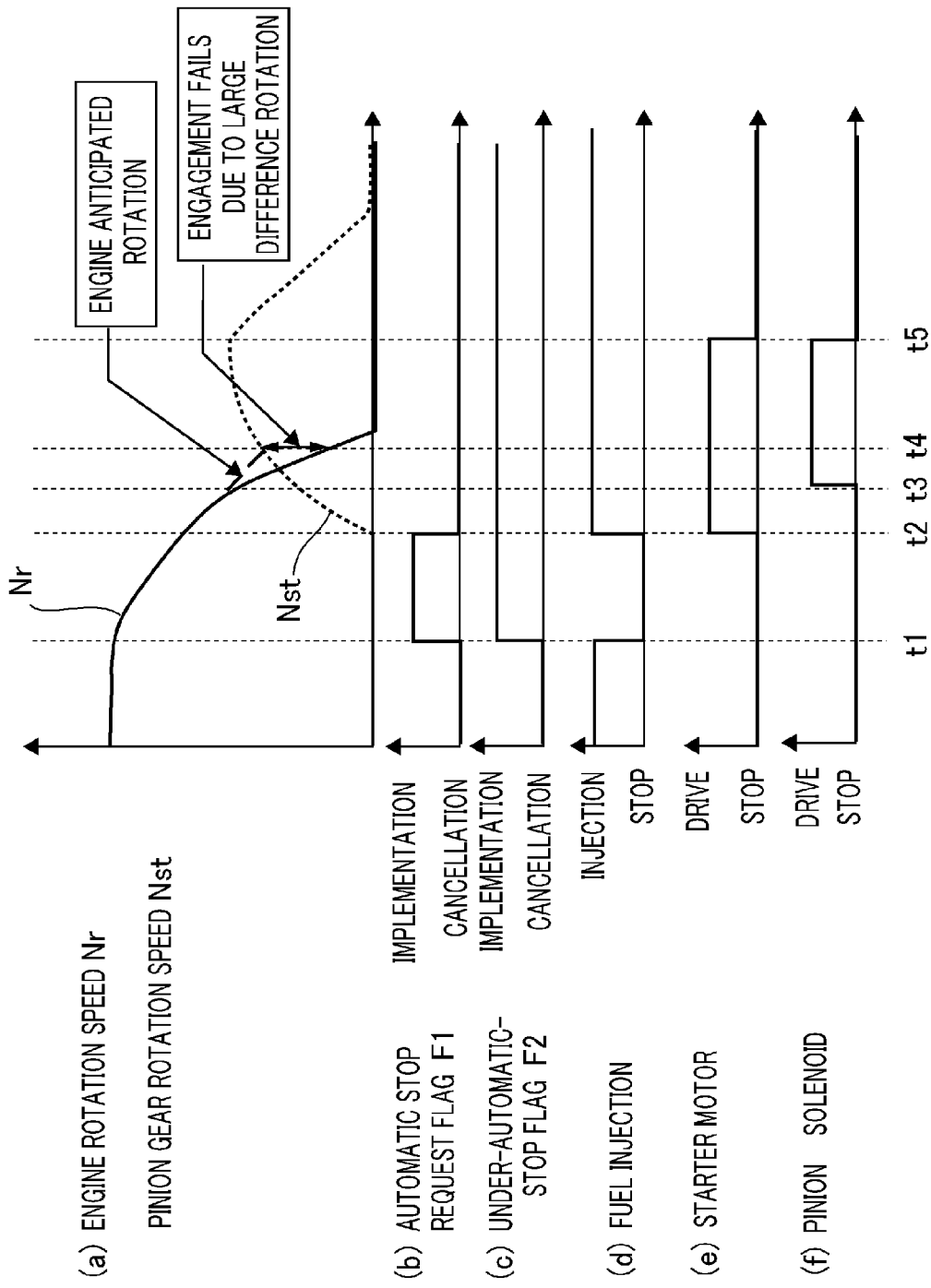
FIG. 11 is a timing chart representing the operation of a conventional engine automatic-stop/restart system.

FIG. 11 is a timing chart representing the operation of a conventional engine automatic-stop/restart system; FIG. 11 represents a case where the conventional system is the one disclosed in Patent Document 1. In the case of the conventional system disclosed in Patent Document 1, as represented in FIG. 11, the engine rotation speed at a time instant when the pinion gear and the ring gear make contact with each other is anticipated, and then the synchronization between the pinion gear and the ring gear is started; however, in order to accurately anticipate the engine rotation speed, an engine control system, which controls the engine, needs to calculate an anticipated value by taking the load condition of the engine, the change with time, and the like into consideration; thus, there has been a problem that a large load is imposed on the engine control system. Moreover, there has been a problem that when the anticipation of the engine rotation speed is different from the actual rotation speed (at the time instant t4 in FIG. 11), large noise is caused when the pinion gear and the ring gear make contact with each other, or the engagement between the pinion gear and the ring gear fails, and hence restarting of the engine cannot be performed. Accordingly, there has been proposed a method where the pinion gear is made to be on standby immediately before the pinion gear and the ring gear engage with each other; however, in order to make the pinion gear and the ring gear on standby immediately before they engage with each other, it is required that the solenoid for pushing out the pinion gear can preliminarily be energized in a duty driving manner; thus, there has been a problem that it is required to utilize expensive components and expensive electronic circuits. In contrast, an engine automatic-stop/restart system according to Embodiment 1 of the present invention can solve these problems in conventional systems.

Figure 12:
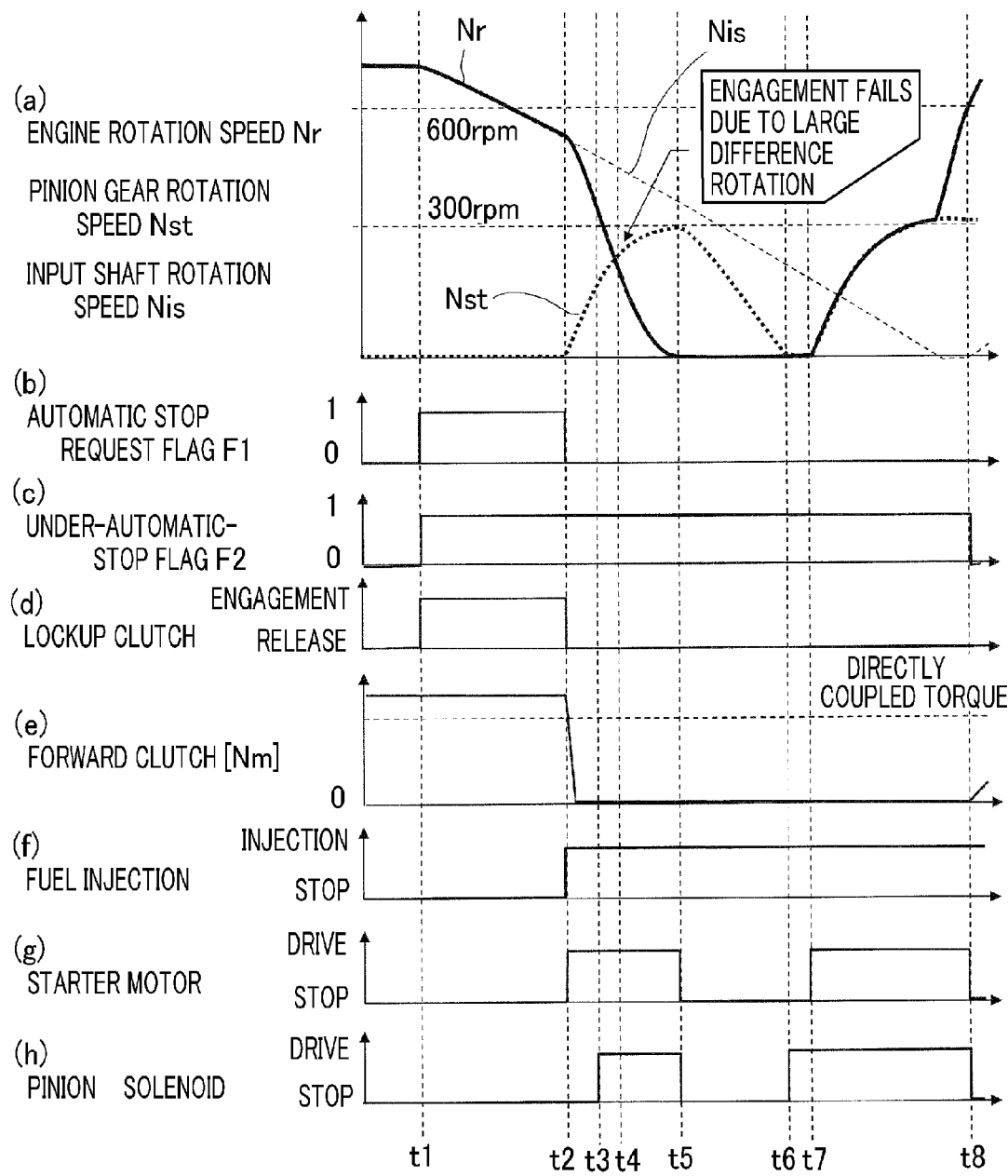
FIG. 12 is a timing chart representing the operation of a conventional engine automatic-stop/restart system.

FIG. 12 is a timing chart representing the operation of a conventional engine automatic-stop/restart system; FIG. 12 represents a case where the conventional system is the one disclosed in Patent Document 2. In the case of the conventional system disclosed in Patent Document 2, as represented in FIG. 12, in order to maintain the engine rotation speed even after the engine has automatically stopped, the lockup clutch and the forward clutch are made to engage with each other so that the wheel axle and the crankshaft are directly coupled. After that, when in response to the engine restarting request, the engine stopping request is cleared and then the engine restarts, the lockup clutch and the forward clutch are released in order to restart the engine, so that the direct coupling between the wheel and the engine is released; thus, in the case of an engine whose engine rotation speed rapidly decreases, before the fuel is ignited and burns due to the restarted fuel injection, the engine may stop. In the case of a starting apparatus that, in order to deal with the foregoing case, not only drives a starter but also makes the pinion gear and the ring gear engage with each other so as to restart the engine, after the rotation speed of the pinion gear and the rotation speed of the ring gear have synchronized with each other, when as is the case with FIG. 11, the anticipation of the engine rotation speed is different from the actual rotation speed (at the time instant t4 in FIG. 12), the engagement between the pinion gear and the ring gear fails and hence restarting of the engine cannot be performed. Accordingly, it is required that the starter motor is temporarily stopped (at the time instant t5 in FIG. 12), and after the engine rotation and the starter rotation have both stopped (at the time instant t6 in FIG. 12), the pinion gear and the ring gear are again made to engage with each other so that the starter motor is driven so as to perform starting again; thus, there has been a problem that starting time is prolonged. In contrast, an engine automatic-stop/restart system according to Embodiment 1 of the present invention can solve these problems in conventional systems.

As described above, in the engine automatic-stop/restart system according to embodiment 1 of the present invention, the engine is automatically stopped while the vehicle decelerates, an when the engine is restarted, the fastening power of the forward clutch 33 is controlled so that the engine rotation speed becomes equal to a predetermined rotation speed; therefore, because the rotation-speed fluctuation of the ring gear 12 is small, the engagement can securely be performed, whereby the restarting time can be shorten.

Various modifications and alterations of this invention will be apparent to those skilled in the art without departing from the scope and spirit of this invention, and it should be understood that this is not limited to the illustrative embodiments set forth herein.

What is claimed is:

1. An engine automatic-stop/restart system that automatically stops an engine when an automatic stopping condition is satisfied while a vehicle travels and then restarts the engine when a restarting condition is satisfied, the engine automatic-stop/restart system comprising:
a starter motor that is energized to rotate;
a pinion gear provided on the rotor shaft of the starter motor;
a ring gear provided on the crankshaft of the engine;
a solenoid that is energized to be biased;
a plunger that pushes out the pinion gear in the axis direction thereof when the solenoid is energized, so that the pinion gear engages with the ring gear;
a crank angle sensor that detects a crank angle of the engine and outputs a crank angle signal;
a fuel injection device that injects fuel into the engine;
a forward clutch that transmits torque produced by the engine to a transmission;
a first control system that connects a power source with the starter motor in response to a first drive signal so as to energize the starter motor and connects the power source with the solenoid in response to a second drive signal so as to energize the solenoid;
a second control system that controls the fuel injection device to make the fuel injection device inject fuel into the engine when the engine that has automatically stopped is restarted, that outputs the first drive signal to the first control system when the rotation speed of the engine is lower than a predetermined value, and that outputs the second drive signal to the first control system so as to energize the solenoid when the absolute value of a rotation-speed difference between an engine rotation speed calculated based on the cycle of the detected crank angle signal and the rotation speed of the pinion gear becomes smaller than a rotation speed difference threshold value at which the pinion gear and the ring gear can engage with each other; and
a third control system that is configured in such a way as to control the coupling degree of the forward clutch so that the rotation speed of the engine can be controlled, when the engine, which cannot autonomously rotate only with fuel supply, is restarted and the rotation speed of an input shaft of the transmission is the same as or higher than the engine rotation speed, and that releases the forward clutch after the pinion gear and the ring gear have engaged with each other.

2. The engine automatic-stop/restart system according to claim 1, wherein when the rotation speed of the input shaft of the transmission is the same as or higher than the engine rotation speed and is lower than a predetermined value, the third control system controls the rotation speed of the engine by making the forward clutch to be coupled so as to transmit reverse torque from the vehicle axle to the engine.

3. An engine automatic-stop/restart system provided with a control system that automatically stops an engine when an automatic stopping condition is satisfied while a vehicle travels and then restarts the engine when a restarting condition is satisfied after the engine has automatically stopped, the engine automatic-stop/restart system comprising:
  a starter motor that is energized to rotate;
  a pinion gear provided on the rotor shaft of the starter motor;
  a ring gear provided on the crankshaft of the engine;
  a solenoid that is energized to be biased;
  a plunger that pushes out the pinion gear in the axis direction thereof when the solenoid is energized, so that the pinion gear engages with the ring gear;
  a crank angle sensor that detects a crank angle of the engine and outputs a crank angle signal;
  a fuel injection device that injects fuel into the engine; and
  a forward clutch that transmits torque produced by the engine to a transmission,
  wherein the control system makes the fuel injection device stop injection of the fuel so as to stop the engine, when the automatic stopping condition for the engine is satisfied,
  makes the fuel injection device resume injection of the fuel, when there is satisfied the restart condition for the engine that has stopped,
  energizes the starter motor when after injection of the fuel has resumed, starting of the engine is not completed,
  controls the coupling degree of the forward clutch so as to control the rotation speed of the engine, when the engine cannot autonomously rotate only with fuel supply and the rotation speed of an input shaft of the transmission is the same as or higher than the engine rotation speed and is lower than a predetermined value,
  energizes the solenoid when the absolute value of a rotation-speed difference between an engine rotation speed calculated based on the cycle of the detected crank angle signal and the rotation speed of the pinion gear becomes smaller than a rotation speed difference threshold value at which the pinion gear and the ring gear can engage with each other, and
  releases the forward clutch after the pinion gear and the ring gear have engaged with each other.

* * * * *